Nov. 9, 1965   C. D. ROHRBACH   3,216,236
ELECTRICAL APPARATUS
Filed Nov. 14, 1962

INVENTOR.
CARL D. ROHRBACH
BY *Arthur H. Swanson*
ATTORNEY.

United States Patent Office 3,216,236
Patented Nov. 9, 1965

3,216,236
ELECTRICAL APPARATUS
Carl D. Rohrbach, North Wales, Pa., assignor to
Honeywell Inc., a corporation of Delaware
Filed Nov. 14, 1962, Ser. No. 237,543
6 Claims. (Cl. 73—1)

This invention relates to temperature control apparatus. More specifically, the present invention relates to cryogenic temperature control apparatus.

An object of the present invention is to provide an improved cryogenic temperature control apparatus for controlling the temperature of a cryogenic bath.

Another object of the present invention is to provide an improved cryogenic bath temperature control apparatus which is particularly suitable for calibrating resistance thermometers.

Still another object of the present invention is to provide an improved resistance thermometer calibrating apparatus having a temperature controlled cryogenic bath.

In accomplishing these and other objects, there has been provided in accordance with the present invention, a temperature control apparatus comprising a vented dewar flask receptacle for holding a cryogenic liquid. A closed hollow vessel is suspended in the cryogenic liquid bath and is connected to the outside of the dewar by a fluid-tight tube piercing the vessel. A reference thermometer is positioned in the flask and is connected to a controller for comparison of the thermometer output signal with a set-point signal. The controller output signal is used to control a power regulator supplying an energizing signal to a heater winding within the vessel. A sample thermometer to be calibrated is also positioned within the vessel and is connected to a read-out device for recording an output signal from the sample thermometer.

A better understanding of the present invention may be had from the following detailed description when read in connection with the accompanying drawing in which.

Figure 1:
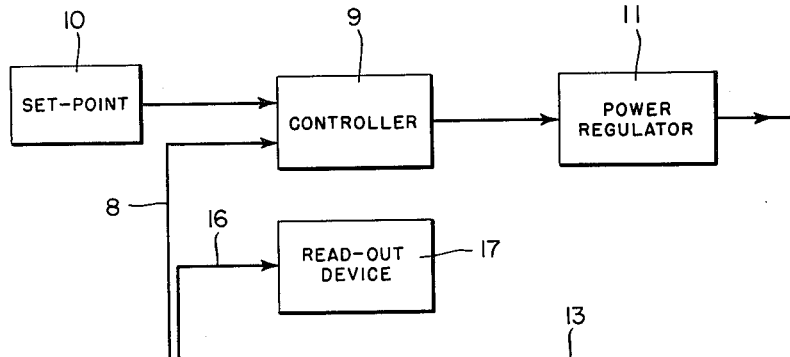
FIG. 1 is a pictorial representation of a cryogenic temperature control apparatus embodying the present invention.
Figure 1:
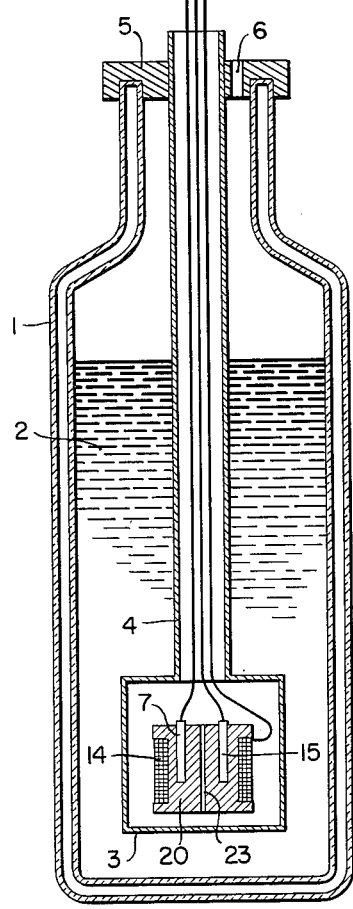

Referring to the FIG. 1, there is shown a temperature control apparatus embodying the present invention and comprising a dewar flask receptacle 1 for containing a bath of a cryogenic fluid 2; e.g., liquid hydrogen. A closed vessel 3 is suspended in the dewar 1 by a tube 4 which tube pierces the vessel 3 in a fluid-tight connection through a dewar cap 5 to the outside of the dewar 1. The cap 5 has a hole 6 for venting any gas within the dewar 1 above the cryogenic fluid 2. A reference thermometer 7 is positioned within the vessel 3 for measuring the interior temperature of the vessel 3. The thermometer 7 is connected by a wire 8 to a controller 9. The controller 9 may be any suitable device for comparing an input signal with a reference, or set-point, signal and producing an output signal representative of the comparison operation. The set-point signal is supplied to the controller 9 by a set-point device 10.

The output signal from the controller 9 is applied to a power regulator 11 to control an output energizing signal supplied by the regulator 11 along a line 13. Line 13 is connected to a heater winding 14 inside the vessel 3. A sample thermometer to be calibrated 15; e.g., a resistance thermometer, is also positioned within the vessel 3 and is connected by a wire 16 to a read-out device 17. The read-out device 17 may be any suitable device for providing an indication of the operation of the sample thermometer 15.

In operation, the present invention is effective to control the temperature inside the vessel 3 by controlling the amplitude of the energizing signal applied to the heater winding 14. Thus, the reference thermometer 7 provides an indication of the internal temperature of the vessel 3 to the controller 9 for comparison with a set-point signal. If the comparison operation indicates a deviation from the set-point signal, the controller output signal is varied to control the regulator 11 whereby the heat supplied by the heater winding 14 is adjusted. This adjustment is arranged to bring the internal temperature of the vessel 3 back to the desired temperature. The desired temperature is maintained by the heat exchange relationship between the heater winding 14 and the cryogenic liquid 2 acting as a large capacity heat sink having a very low stable temperature. Thus, the temperature of the interior of the vessel 3 may be accurately varied above the temperature of the cryogenic liquid 2 by varying the heat supplied by the heater winding 14.

Accordingly, it may be seen that there has been provided, in accordance with the present invention an improved cryogenic temperature control apparatus for controlling a cryogenic bath temperature and having particular utility in calibrating resistance thermometers.

Figure 2:
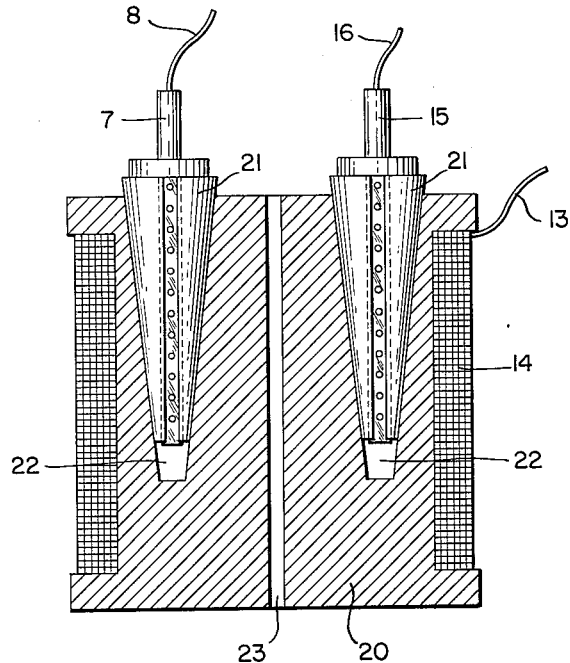
FIG. 2 is a detailed pictorial representation of the thermometer mounting structure shown in FIG. 1.

In FIG. 2, there is shown a detailed pictorial representation of the thermometer mounting structure shown in FIG. 1. The thermometers 7 and 15 are held in a block 20 of pure copper; e.g., electrolytic tough pitch copper, by tapered collets 21 which mate with tapered holes 22 in the block 20. The collets 22 are a snug fit on the thermometers 7 and 15. The collet and thermometer assembly is then inserted for a tight fit in the holes 22. Thus, a good thermal contact is established between the thermometers 7 and 15 and the block 20. A plurality of holes such as hole 23 may be provided in the block 20 to increase the surface area of the block 20 whereby the thermal response of the block 23 to the effect of the winding 14 and the cryogenic bath 2 may be improved.

What is claimed is:
1. A cryogenic temperature control apparatus comprising a cryogenic liquid bath, a vented receptacle for holding said cryogenic bath, a closed hollow vessel positioned in said bath and operative to provide a heat transfer path between the interior and exterior of said vessel, fluid-tight means connecting the interior of said vessel with the outside of said receptacle, a reference thermometer means positioned inside said vessel, control means connected to said thermometer means and operative to compare an output signal from said thermometer means with a set-point signal, heater means positioned in a heat exchange relationship with said vessel and said cryogenic bath, and power regulator means connected to said con- trol means and to said heater means operative to vary an energizing signal for said heater means in response to an output signal from said control means.

2. A cryogenic temperature control apparatus as set forth in claim 1 wherein said cryogenic bath is a liquid hydrogen bath.

3. A cryogenic temperature control apparatus as set forth in claim 2 including a sample thermometer to be calibrated positioned inside said vessel and read-out means connected to said sample thermometer to provide an indication of the output signal from said sample thermometer.

4. A cryogenic temperature control apparatus as set forth in claim 3 wherein said reference thermometer and said sample thermometer are supported in a thermally initimate relationship in a support means comprising a block of thermally conductive material, a pair of tapered holes in said block, a pair of thermally conductive collets each having an external taper arranged to mate with said holes and an axial bore to accommodate one of said thermometers whereby said collets are operative to retain said thermometers in respective ones of said holes with a good thermal connection to said block.

5. A cryogenic temperature control apparatus comprising a cryogenic liquid bath, a vented receptacle for holding said cryogenic bath, a closed hollow vessel positioned in said bath and operative to provide a heat transfer path between the interior and exterior of said vessel, fluid-tight means connecting the interior of said vessel with the outside of said receptacle, heater means positioned in a heat exchange relationship with the interior of said vessel, said heater means having energizing leads carried within said fluid-tight means to the outside of said receptacle and power supply means connected to said heater by said leads and operative to supply an energizing signal for said heater means whereby to affect the effective temperature within said vessel.

6. A cryogenic temperature control apparatus as set forth in claim 1 wherein said cryogenic bath is a liquified constituent of air.

References Cited by the Examiner
UNITED STATES PATENTS

| | | | |
|---|---|---|---|
| 2,406,080 | 8/46 | Laird | 73—1 |
| 2,552,087 | 5/51 | Cooper | 73—1 |
| 3,011,709 | 12/61 | Jacoby | 236 |
| 3,033,020 | 5/62 | Pakulak et al. | 73—15 |
| 3,045,473 | 7/62 | Hager | 73—15 |
| 3,106,084 | 10/63 | Hoffman et al. | 73—4 |

ISAAC LISANN, *Primary Examiner.*